United States Patent

Brenneman et al.

[15] 3,637,431
[45] Jan. 25, 1972

[54] COATING COMPOSITION AND ARTICLE COATED WITH SAME

[72] Inventors: Richard S. Brenneman, Natick; John J. Clancy, Westwood; William T. MacLeish, Andover; Robert C. Wells, Arlington, all of Mass.

[73] Assignee: Arthur D. Little, Inc., Cambridge, Mass.

[22] Filed: Sept. 30, 1968

[21] Appl. No.: 763,884

[52] U.S. Cl. .................................. 117/155 UA, 117/156
[51] Int. Cl. .................................. D21h 1/38, D21h 1/34
[58] Field of Search ........ 117/11, 155 UA, 161 UC, 161 UH, 117/161 UD, 156

[56] References Cited

UNITED STATES PATENTS

| | | | |
|---|---|---|---|
| 2,759,847 | 8/1956 | Frost et al. | 117/164 X |
| 2,961,334 | 11/1960 | Clancy et al. | 117/164 X |
| 3,028,258 | 4/1962 | Rice | 117/156 X |
| 3,108,009 | 10/1963 | Clancy et al. | 117/164 X |
| 3,157,533 | 11/1964 | Clancy et al. | 117/164 X |
| 3,306,763 | 2/1967 | Hoge | 117/155 X |
| 3,328,184 | 6/1967 | Weber | 117/164 X |
| 3,347,702 | 10/1967 | Clancy | 117/36.7 X |
| 3,372,044 | 3/1968 | Weber | 117/164 X |
| 3,399,060 | 10/1968 | Clancy | 117/201 X |
| 3,497,380 | 2/1970 | Weber | 117/161 UX |

Primary Examiner—William D. Martin
Assistant Examiner—M. R. Lusignan
Attorney—Bessie A. Lepper

[57] ABSTRACT

An emulsion coating composition and a substrate coated therewith. The aqueous phase of the coating contains a blend of resinous materials, one resin component, such as casein, forming a matrix structure and the other, such as an acrylic polymer, forming an essentially continuous film. The coating after drying contains small air-binder interfaces which scatter light. The resin components making up the binder may be chosen to give the coating a wide range of physical and chemical properties.

13 Claims, 4 Drawing Figures

PATENTED JAN 25 1972 3,637,431

Richard S. Brenneman
John J. Clancy
William T. MacLeish
Robert C. Wells
INVENTORS BY *Bernie A. Lepper*
Attorney

COATING COMPOSITION AND ARTICLE COATED WITH SAME This invention relates to a novel coating and to substrates coated with it. More particularly, this invention relates to a novel, opaque coating which is essentially water-insensitive and which may have modified surface characteristics including sensitivity or insensitivity to pressure, printing strength, ink receptivity and the like.

Many surfaces require one or more coatings for decoration, protection, or modification of their physical characteristics. For example, paint is used to decorate and protect walls, woodwork and the like; highly pigmented coatings are applied to paper and paperboard to cover their surfaces with a base coating to which further decorations and printing may be applied; and opaque coatings which are pressure sensitive to a predetermined degree are applied to colored, normally lightweight, papers to make a surface which may be marked by application of pressure alone.

In recent years there has been developed a new technology in the coating art which has come to be referred to generally as "bubble coating" technology, a term which will hereinafter be used to describe a coating composition, a method of application and a coating, the final structure of which comprises an essentially continuous binder film having uniformly distributed throughout minute air-binder interfaces which cause the scattering of light. The presence of these air-binder interfaces gives rise to the use of the descriptive but rather general term "bubble coating." Because the coating in its unique physical form develops desired optical properties, it need not contain any of the usual pigment materials such as titania chalk, clay and the like. This in turn materially reduces coating weight for a given degree of brightness and opacity. However, this coating composition and the resulting coating may contain relatively large quantities of finely divided particulate material for a number of different purposes such as ink receptivity, ease of application of the liquid coating, ease of drying, and additionally desired optical effects.

The prior art of bubble coating is represented by five U.S. Pat. Nos. 2,961,334, 3,108,009, 3,157,533, 3,347,702 and 3,399,060. In addition a copending application Ser. No. 638,520 now abandoned and refiled as Ser. No. 881,693 filed in the names of Richard S. Brenneman, John J. Clancy and Robert C. Wells is directed to an improvement of the coating composition and method of U.S. Pat. No. 3,108,009 to provide a high-gloss coating which has good reflectivity and printing properties.

In this prior art there is disclosed first in U.S. Pat. No. 3,108,009 a basic coating composition, method of application and coated substrate in which a proteinaceous material, specifically casein or soya protein forms the film structure containing the air-binder interfaces. A synthetic or natural rubber may be used to replace some of the proteinaceous film forming binder material. The coating prepared according to the teaching of this invention is extremely bright and opaque. It can be formed to be controllably pressure sensitive within a limited range and may incorporate finely divided particulate material to attain certain desirable surface characteristics. U.S. Pat. No. 3,157,533 teaches that the addition of starch to the basic formulation materially enhances its ease of application to a substrate and contributes desirable properties to the finished coating. Copending application Ser. No. 638,520 discloses that a small amount of a film-forming thermoplastic resin may be added to give a bubble coating which is receptive to a unique succession of treating steps to form a high-gloss coating.

An improvement of the basic coating composition, method and article described in U.S. Pat. No. 3,108,009 is set forth in U.S. Pat. No. 2,961,334 which teaches the incorporation of a relatively large quantity of a so-called "transparentizing agent" to render the finished coating highly sensitive to pressure thus making it a lightweight coating particularly suitable for making multiple copies by application of pressure without the use of carbon paper. The film formers in this composition, in addition to casein, soya protein and mixtures of these with rubbers, are such water-sensitive materials as polyvinyl alcohol, glue, modified starches, sodium silicate, methyl cellulose, ethyl cellulose and shellac.

Finally, U.S. Pat. Nos. 3,347,702 and 3,399,060 teach the application of the bubble coating technique to the formation and use of electrophotographic coatings and copy papers.

It will be seen that the film-forming materials in the prior art have been limited to proteinaceous materials with or without particulate additives, and to a relatively restricted number of water-sensitive materials. Although elastomers, i.e., natural or synthetic rubbers, may be used, they are not ideally suited to contributing additionally desired properties such as precise control of pressure-sensitivity, water-insensitivity, resistance to weathering, and the like. Moreover, although the use of large quantities of a transparentizing agent makes the bubble coating highly sensitive to pressure, its presence may be undesirable, particularly in applications where high-speed printing is a requirement.

Despite numerous attempts to extend the bubble technology to nonelastomeric synthetic resins (i.e., those which did not exhibit a material degree of elasticity such as the natural and synthetic rubbers disclosed in U.S. Pat. No. 2,961,334, 3,108,009 and 3,157,533) in order to obtain the advantages inherent in the "tailor-made" properties of such synthetic resins, difficulties were continually encountered in their use. In general these difficulties were exhibited in an inability to form them into the desired "bubble" structure to achieve efficient use of materials or to attain a permanent degree of opacity in the coating made with them. We have now, however, discovered that by using a blend of what may for convenience be termed "hard" or "matrix structure-forming" and "soft" or "film-forming" components, it is possible to extend bubble technology to the use of synthetic resins, thus making an entirely new class of bubble coatings available for such diverse uses as pressure-sensitive coatings markable by pressure alone which take the place of carbon paper, printing or publication papers and indoor and outdoor paints.

It is, therefore, a primary object of this invention to provide an improved coating composition suitable for use in bubble coating technology. It is another object of this invention to provide a coating composition of the character described which makes it possible to use a nonelastomeric resin as at least one of its binder-forming constituents. It is another object of this invention to provide a bubble coating comprising at least one nonelastomeric synthetic resin component, the component being chosen to impart to the coating a wide range of physical properties. It is another primary object of this invention to provide a coating of the bubble type which exhibits a sensitivity to pressure from essentially zero to being highly sensitive. It is yet another object of this invention to provide among other articles a new improved pressure-sensitive coating for paper which exhibits good printing strength. Other objects of the invention will in part be obvious and will in part be apparent hereinafter.

The invention accordingly comprises the several steps and the relation of one or more of such steps with respect to each of the others, and the article possessing the features, properties and the relation of elements which are exemplified in the following detailed disclosure, and the scope of the invention will be indicated by the claims.

For a fuller understanding of the nature and objects of the invention, reference should be had to the following detailed description taken in connection with the accompanying drawings in which FIG. 1 is a diagrammatic cross-sectional representation of the coating composition of this invention immediately after application to a substrate;

Figure 1:
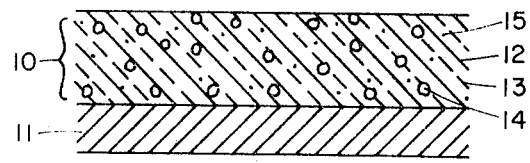

In bubble technology, the basic coating composition is comprised of an oil-in-water emulsion, the oil phase being dispersed in the form of globules within a size range which corresponds essentially directly to the size of the air-binder interfaces formed in the final coatings. Normally, for maximum lightscattering and hence maximum opacity, these interfaces are of a size such that their maximum dimensions are about equal to the wavelength of the visible light range of the electromagnetic spectrum. This means then that essentially all of the water-immiscible globules making up the oil or discontinuous phase of the coating emulsion will range from about one-tenth to 1 micron. It is preferable that no appreciable number exceed 5 microns if high opacity and efficient use of coating materials are sought. The film-forming binder material is dissolved or dispersed in the continuous aqueous phase while additives such as emulsifiers, pigments, other particulate material, dyes, etc., may be dissolved or dispersed in either or both of the two liquid phases forming the emulsion.

The emulsion coating is applied to the surface of the substrate in a manner to retain the original emulsion structure. The water-immiscible discontinuous phase is chosen to have a boiling point above water (e.g., kerosene, xylene and the like) so that as drying begins the water of the continuous phase is volatilized first. With the removal of at least a portion of the water, the film-forming binder material sets up into a matrix structure in which the water-immiscible liquid globules are entrapped, thus maintaining the relative spatial relationship of the globules with some decrease in actual coating thickness. Continued drying then effects volatilization of the water-immiscible liquid from the matrix with the formation of the air-binder interfaces throughout the film structure which is stabilized in its unique form. Thus in the prior art the casein or soya protein binder material played the dual role of matrix structure-former and film-former.

It is believed that single-component synthetic resin-binder systems failed in the requirement to be able to establish a stable permanent matrix structure prior to the removal of the discontinuous phase liquid, or to be able to maintain this structure without collapsing once the discontinuous phase liquid was finally removed. Thus the synthetic resins which are capable of imparting completely new properties to bubble coatings or of enhancing the present properties of these coatings could not be used effectively.

In practice of this invention these restrictions on the use of synthetic resins are overcome by forming the binder material of at least two components, one contributing substantially to the initial formation and the other to the final formation of the required bubble structure. The binder materials are, therefore, formed of a blend of components. One component is essentially a structure-forming material and it may or may not be a film-forming synthetic resin at the drying temperature. It must, however, be capable of setting up into a matrix structure as the water of the continuous phase of the emulsion is removed from the applied coating. The other component is a film-forming synthetic resin which builds the necessary essentially continuous film around the matrix structure upon the removal of the water-immiscible liquid discontinuous phase. Such a blend permits a wide selection of film-forming resins to give the final coating its desired physical properties while maintaining the optical properties associated with the bubble structure.

The blends usable fall into three general classes which may be defined as 1. a physical blend of a matrix structure-forming resin and a film-forming resin, each of the resins being dissolved or dispersed in the aqueous phase, 2. a chemical blend in which two different resin components are copolymerized, one component contributing to the formation of the matrix structure, the other to the formation of the film. The copolymer may be soluble or dispersible in the aqueous phase, and 3. a physical blend of a matrix structure-forming resin dissolved or dispersed in the aqueous phase and a coalescing agent for the resin dissolved or dispersed in the aqueous phase or dissolved in the discontinuous phase.

Although it is possible to delineate the types of blends into these three general classes, in many instances a coating composition may contain more than one class of blend in order to obtain the desired physical characteristics in the final coating. Thus a portion of the matrix structure-forming resin system may be derived from a single resin and a portion from a copolymer, the copolymer furnishing all or part of the film-forming component.

FIGS. 1–4 are presented to describe the coating emulsion and structure. These figures are entirely diagrammatic and are not meant to be taken as an actual representation of a cross section of the coating or coated surface. However, it is believed that they can be used by way of explanation of what is believed to be taking place during application and drying of the coating.

In FIG. 1 the coating 10 is applied to the substrate 11. The coating contains in its aqueous phase a matrix structure-forming resin represented by the solid lines 12, a film-forming resin represented by the dashed lines 13 and small globules 14 of a water-immiscible liquid as the discontinuous phase. Finely divided particulate material 15 may also be present.

Figure 2:
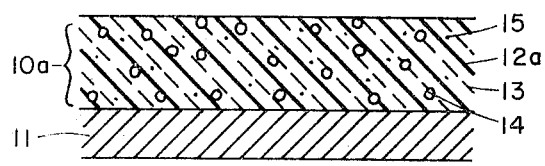
FIG. 2 is a diagrammatic cross-sectional representation of the coating of FIG. 1 after at least a portion of the water is removed.
Figure 3:
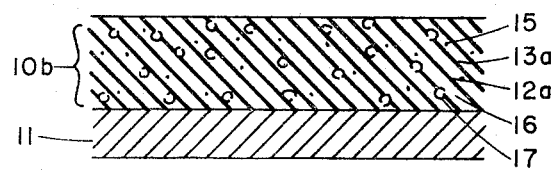
FIG. 3 is a diagrammatic cross-sectional representation of the finally dried coating.

As the water from the continuous phase is removed the matrix structure-forming resin sets up as represented by the heavy solid lines 12a in FIG. 2 to give a partially dried coating 10a. Then as more water is removed and the discontinuous phase liquid is driven off the film-forming material also sets up as represented by heavy lines 13a, the binder system 16 takes form and the air-binder interfaces 17 which scatter light are formed, giving rise to a permanent "bubble" coating 10b.

Figure 4:
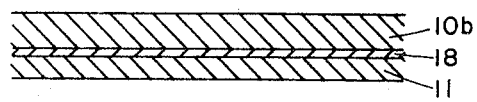
FIG. 4 is a cross section of a modification of a coated substrate showing an intermediate layer.

In FIG. 4 a modification of the coated article is shown in which a colored layer 18 is interposed between the bubble coating 10b and the substrate 11.

The following examples are set forth to illustrate more clearly the principle and practice of this invention to those skilled in the art and are not to be construed as limitations on the invention. The three classes of blends are illustrated as well as the wide range of application for the coatings.

Examples 1–9 illustrate the first class blends, i.e., the physical blending of two resins, each serving primarily in one of the two roles described.

EXAMPLE 1

A nonfilm-forming polyvinylchloride copolymer latex (56 percent solids) sold as Geon 351 by B. F. Goodrich Company was used as the harder matrix structure-forming resin and a film-forming vinyl chloride-acrylate copolymer latex (53 percent solids) sold by B. F. Goodrich Company as Geon 450×23 was used as the softer film-forming resin component. The latices were first combined and then 112 parts by weight of a petroleum fraction (distillation range between 205° and 258° C.) was added with mechanical stirring. The resulting emulsions were coated on contrast ratio charts with an applicator blade at the rate of approximately 400 square feet per gallon. The coatings were allowed to air dry overnight and the reflectances of the coatings over the black background were measured using a green filter. The reflectance for three coatings containing three different ratios of the harder to softer resins were as follows:

| Harder, nonfilm-forming resin | 75 | 67 | 50 | Parts by weight |
|---|---|---|---|---|
| Softer, film-forming resin | 25 | 33 | 50 | Parts by weight |
| Reflectance | 67% | 40% | 0% | |

In the evaluation of the bubble coatings, percent reflectance of a standard-weight coating is contains as a measure of the efficiency of the coating. It is a measure of brightness and is obtained by direct measurement using a commercially available reflectometer or brightness meter. Reflectance values below about 40 percent for application weights of about 400 square feet per gallon are considered as indicative of the inability of the coating composition to form a desirable bubble structure. Thus from these reflectance data it will be seen that the binder system in the bubble coating requires a sufficient quantity of a matrix structure-forming resin to form and retain the bubble structure.

EXAMPLE 2

Two acrylic polymer latices were used in the binder system of this example, the first was nonfilm-forming (45 percent solids) which gave a hard brittle polymer upon drying (sold as Rhoplex C-72 by Rohm & Haas Company) and the second was a film-former (46 percent solids) which gave a soft polymer upon drying (sold as AC-33 by Rohm & Haas Company). In formulating the coating compositions, 1 part ammonium hydroxide (29 percent $NH_3$) was added to 100 parts of the latex mixture and then 1 part of a partial amide of a vinyl methyl ether-maleic anhydride copolymer was added as a thickening agent and to promote better wetting of the substrate to which the coating is applied. Finally 90 parts of an aliphatic hydrocarbon blend (distillation range of 177 and 187° C.) was added with stirring to form the emulsion which was subsequently refined to the extent that the oil globules were in the size range between about 0.4 and 1 micron.

The coating compositions with varying resin ratios were applied to black cardboard at the rate of approximately 400 square feet per gallon. The coatings were air dried overnight and then reflectance measurements (using a green filter) were made with the following results for three different coatings:

| Hard, nonfilm-forming resin | 75 | 72.5 | 70 | Parts by weight |
| --- | --- | --- | --- | --- |
| Softer, film-forming resin | 25 | 27.5 | 30 | Parts by weight |
| Reflectance | 51% | 49% | 54% | |

All of these compositions therefore formed a bubble structure.

A number of other resin mixtures were evaluated using a basic formulation in which one part of binder and two parts of a liquid aliphatic hydrocarbon (having a distillation range between 205° and 258° C.) with sufficient water to give a desired viscosity formed the emulsion. Emulsifying and solubilizing agents were used in small amounts where required and the formation of the liquid coating composition was carried out as described in example 2. A number of the resin binder mixtures were made up using a range of resin components. Reflectances were determined for all the coatings formed, and these data are tabulated below.

| Example Number | Matrix structure-forming resin (1) | Film-forming resin (2) | Weight ratio of (1) to (2) | Percent reflectance of coating |
| --- | --- | --- | --- | --- |
| 3 | Casein | Acrylic polymer[1] | 10/90 | 20 |
| 4 | do | do[1] | 15/85 | 67 |
| 5 | do | do[1] | 20/80 | 80 |
| 6 | Ammonium salt of an acrylic synthetic resin complex[2] | do[1] | 5/95 | 13 |
| 7 | do[2] | do[1] | 10/90 | 55 |
| 8 | do[2] | do[1] | 15/85 | 79 |
| 9 | do[2] | do[1] | 20/80 | 80 |

[1] Sold as Rhoplex AC-34 by Rohm & Haas Company.
[2] Sold as Amberlac 165 by Rohm & Haas Company.

These data further show that it is necessary to have a sufficient quantity of the matrix structure-forming resin present to form the desired bubble coating. In the case of examples 3–5, it is desirable to have at least 15 percent by weight casein; while in examples 6–9, the harder resin should be present in an amount equivalent to at least 10 percent by total binder weight.

Examples 10–13 illustrate the second type of blend, namely a copolymer which contains within its structure the required binder components.

EXAMPLE 10

Pressure-sensitive bubble coatings for pressure marking without the use of carbon paper were made by dissolving 60 parts of a styrene-maleic anhydride resin (sold as Lytron 822 by Monsanto Company) in an ammoniacal water containing 420 parts water and 20 parts ammonium hydroxide (29 percent $NH_3$) at 38° C. An aliphatic hydrocarbon having a distillation range between 160° and 182° C. was emulsified into the aqueous phase with stirring and the emulsion was refined at 1,500 p.s.i.g. in a Manton-Gaulin Homogenizer. The coating was applied to a black precoated 10-pound register bond (17×22–500 basis) at a level of 1.2 pounds per ream with a No. 18 wire-wound rod.

The coated sheet had a 72 percent brightness or reflectance and produced six excellent copies on an IBM typewriter. However, the IGT pick resistance was less than 100 feet per minute with a No. 1 Tack Rated Ink and the coated sheet had a relatively low resistance to scuff and abrasion. Although this coating with a high sensitivity to pressure would be useful for chart paper and the like where it would receive minimum handling, it would not be desirable for manifold business forms, etc.

EXAMPLE 11

In order to improve the pick resistance and abrasion resistance of example 10, a higher molecular weight resin similar to the styrene-maleic anhydride resin of example 10, was substituted for the resin of example 10. The formulation, preparation and use in this example was similar to example 10 except for the substitution of the resin system.

The coated product produced six legible copies on an IBM typewriter and the pick resistance was improved to 200 feet per minute with a No. 1 Tack Rated Ink. The coated sheet had a 68 percent brightness and a high gloss. The abrasion or scuff resistance of the coating was improved over example 10.

EXAMPLE 12

A styrene-acrylate copolymer was substituted for the copolymer of example 10. The copolymer was a latex sold under the trade name Lytron 100 by Monsanto Company. The reflectance of the resulting coating was 54 percent.

EXAMPLE 13

A vinyl chloride-acrylate copolymer latex (sold as Geon 450×20 by B. F. Goodrich Company) was substituted for the copolymer of example 10. The resulting coating structure collapsed and had a reflectance of zero percent. Although the precise ratio of vinyl chloride to acrylate monomers is knot known, it is evident that this copolymer did not have a sufficient matrix structure-forming content. This is readily discernible from the physical properties of the polymer as described below.

In many coating compositions it is desirable to obtain the desired binder system by combining the first and second classes of blends. Such combinations are illustrated in examples 14–17.

EXAMPLE 14

A pressure-sensitive copy paper for use in multiple part forms was prepared by coating a bubble emulsion on a colored base stock. The resulting highly opaque coating is transparentized under the localized pressure exerted by writing or typing to reveal the colored substrate.

The coating composition was formulated in the following manner, all amounts of ingredients being expressed as parts by weight. An ammonia water solution was formed by mixing 11 parts ammonium hydroxide (29 percent $NH_3$) and 280 parts water. This solution was heated to 82° C. and 8.4 parts of a styrene-maleic anhydride resin (sold as Lytron 810 by Monsanto Company) was dissolved in it. The resulting resin solution was then blended with 250 parts of a resin latex containing 40 percent solids. The latex was a homogeneous blend of an emulsion polymerized styrene homopolymer latex containing as the sole emulsifier a salt of a partial ester of a styrene maleic anhydride copolymer and an emulsion polymerized styrene interpolymer latex (see U.S. Pat. No. 3,396,135 for a detailed description of this type of latex). The styrene portion of these resins provided the matrix structure-forming component of the binder and the maleic anhydride resins along with the monomer combined with the styrene to form the interpolymer provided the film-forming component.

An aliphatic hydrocarbon liquid with a distillation range between 181° and 277° C. was used as the discontinuous oil phase in forming the emulsion. To 188 parts of this liquid was added 0.6 parts of oleic acid as an emulsifying agent. The liquid hydrocarbon containing the emulsifier was emulsified in the aqueous blend of resins with slow speed agitation. The crude emulsion was refined to the correct particle size for maximum hiding power in a Manton-Gaulin Homogenizer, i.e., to reduce the size of the hydrocarbon liquid globules to between about one-tenth and 1 micron. The emulsion had a 15 percent solids content, a viscosity of 500 c.p.s. at 90° F., and a resin-to-oil ratio of 1 to 1.75.

This composition was coated on a base stock colored one one side. The base stock was a 12-pound (17×22–500 basis) register bond paper which was coated on one side with a blue tinted clay coating at a coating weight of 1¼ pounds per ream. The bubble coating was applied to the blue colored side of the paper with a wire-wound rod coater at a level of 1¼ pound per ream (17×22–500) and dried in a festoon drier.

The resulting product was free from curl and had a 72 percent brightness as measured on a Photovolt Brightness Meter. Business forms were printed and collated on a commercial web-offset press. The printed forms produced four excellent copies when typed on by an IBM Executive typewriter at pressure five.

EXAMPLE 15

The pressure sensitivity of a copy paper such as that formed in example 14 may be enhanced to produce more copies on a typewriter or to form a product suitable for use for high-speed computer printout. High-speed impact printers, such as the IBM 360-30, print with much less pressure and time of contact than typewriters and thus they require that the copy papers be more pressure-sensitive. Increased sensitivity in this coating was obtained by adjusting the ratio of matrix sturcture-forming resin to film-forming resin. The emulsion coating composition was prepared by first blending 10.8 parts of the styrene-maleic anhydride resin of example 10, 338 parts of water, 16 parts ammonium hydroxide, 400 parts of the resin latex of example 14 and 250 parts of a water dispersion of an ammonium salt of a synthetic resin complex (22 percent solids) sold by Rohm & Haas Company as Amberlac 165. The last-named resin is a matrix structure-forming component. Thus it will be seen that the ratio of the two types of resin components had been altered to provide relatively more of the matrix structure-forming resin system. This aqueous phase liquid was heated to 82° C. with gentle stirring. After dissolving 2 parts of oleic acid in 690 parts of the hydrocarbon liquid used in example 10, the oil phase solution was emulsified in the aqueous phase with slow-speed stirring. The emulsion was homogenized to obtain a particle size of about one-half micron.

The emulsion was coated on a 12-pound (17×22–500 basis) paper which was precoated one side with a clay-carbon black base coat. The coating was applied with a No. 24 wire-wound rod at a level of 1¼ pounds per ream and drying was accomplished as in example 14.

The coated product had a 75 percent brightness. Printing strength as measured on an IGT Print Tester was 500 feet per minute using a No. 1 Jack-Rated Ink. The product produced three legible copies when printed on an IBM 360-30 printer. In comparison, the copy paper of example 14 barely produces one legible copy using the 360-30 printer.

Example 16

Bubble coatings, based upon the proper blend of synthetic resins, are useful for papers designed for printing applications. These coatings are relatively pressure insensitive and may be supercalendered to provide a smooth, strong, printable surface on a paper having high opacity and brightness. Such a coating was prepared as follows to have good printing characteristics. One hundred and thirty-six parts of a delaminated kaolin (sold as NuClay by Freeport Kaolin Company) and 14 parts of anatase grade titania were dispersed in 504 parts of water. The purpose of these finely divided particulate materials is to contribute physical characteristics to the final coating and not to act primarily as pigments in the usual sense, i.e., to improve optical properties. To this water dispersion were then added 22 parts of the sytrene-maleic anhydride resin of example 10, 30 parts of ammonium hydroxide, and 100 parts of a styrene-butadiene latex (48 percent solids) sold by the Dow Chemical Company as Dow Latex 636. This aqueous phase blend was heated to about 70° C. for one-half hour. A solution of 1 part oleic acid in 104 parts of the hydrocarbon liquid of example 14 was then stirred into the aqueous phase at 70° C. The coating was homogenized at 2,000 p.s.i.g. in a Manton-Gaulin Homogenizer. The coating contained 24 percent solids and had a viscosity of 2,000 c.p.s. It was applied to a 50-pound (25×38–basis) coating raw stock at a level of 4 pounds per ream per side with a No. 10 wire-wound rod. The coated papers were supercalendered at a nip pressure of 400 pounds per lineal inch. The bubble-coated paper was compared to a commercial 60-pound coated offset paper and the data are shown in table 1.

It will be seen from table 1 that the coating of this example equals the commercially available coating in brightness, opacity and printing strength while at the same time exhibiting improved gloss ink holdout. Most importantly, the coating weight was reduced by 2 pounds per ream.

TABLE 1.—COMPARISON OF EXAMPLE 16 COATED PAPER WITH COMMERCIALLY AVAILABLE OFFSET PAPER [1]

| Sample | Basis weight (25 x 38–500) pounds | Percent reflectance | Percent opacity [2] | IGT printing #5 ink strength, f.p.m. [3] | Printing smoothness | Gloss ink holdout |
| --- | --- | --- | --- | --- | --- | --- |
| Coating raw stock of Example 16. | 50 | 85 | 90 | | | |
| Example 16 coated paper. | 58 | 85 | 92 | 370 | Good | Excellent. |
| Commercial offset paper. | 60 | 85 | 93 | 360 | do | Good. |

[1] Measured with Photovolt brightness meter.
[2] Measured by TAPPI Standard T425.
[3] Measured on IGT Print Testing Apparatus.

EXAMPLE 17

A styrene-maleic anhydride resin (Lytron 810 from Monsanto Company) and a synthetic acrylic resin (AC-34 of Rohm & Haas Company) served as the matrix structure-forming a film-forming resins in a formulation made up as in examples 6–9. The weight ratio of resins was 20/80 and the resulting coating had a reflectance of 50 percent.

EXAMPLE 18

A commercially available blend which in essence comprises a combination of the first and second classes of blends was used. One embodiment of this blend is a sold as Lytron 5,202 by Monsanto Company and the general type of blend is described in U.S. Pat. No. 3,396,135. It is available as a 40 percent solids latex and was used in this form by stirring in 80 parts of a liquid aliphatic hydrocarbon (distillation range between 205° and 258° C.) to give a ratio of binder of hydrocarbon of 1-to-2. The emulsion was refined so that the oil-phase globules ranged between one-tenth and six-tenth micron in diameter. The coating, applied and dried as in example 14, had a reflectance of 80 percent.

This coating formulation was modified by the addition of pigment grade titania in an amount equal to the weight of the resin solids to give a composition in which the ratio of binder to pigment to water-immiscible liquid was 1 to 1 to 2. The substrate for coating was cedar clapboard having one coat of an oil-base primer. For comparison, a first portion of the primed substrate was left unpainted, a second portion was coated by brushing on one coat of the composition of this example and a third portion was coated by brushing on an essentially equal weight of a commercially available white latex paint. After drying, the reflectances of the three portions were measured using a green filter to obtain the following measurements:

| | |
|---|---|
| Primed surface | 80% |
| Primed surface with commercial paint | 83 |
| Primed surface with example 18 coating | 90 |

Finally, examples 19 and 20 illustrate the use of a matrix structure-forming resin with a softening or coalescing agent for the resin.

EXAMPLE 19

The hard, nonfilm-forming polymer latex of example 2 was used with two different coalescing agents, namely N-methyl pyrrolidone and diacetone alcohol. In each formulation, 100 parts of the latex, 5 parts of the coalescing agent and 90 parts of a petroleum fraction (distillation range of 205° to 258° C.) were used. The coalescing agent as a 50 percent aqueous solution was added to the latex and the mixture allowed to stand overnight. The petroleum fraction was then added with mechanical stirring and some water (about 50 parts) was added to reduce viscosity. The mixtures were then processed in a Manton-Ganlin Homogenizer at "zero" gauge pressure and the coatings cast at the rate of approximately 600 square feet per gallon on contrast ratio cards. These formulations produced coatings of approximately 40 percent brightness as judged visually.

EXAMPLE 20

A modified acrylic latex (40 percent solids) (sold as Lytron 116 by Monsanto Company) and being characterized as a relatively hard polymer was added in 100 parts to a mixture of 7.5 parts propylene carbonate in 7.5 parts water. Then 80 parts of the hydrocarbon of example 19 was added with stirring. The resulting emulsion was processed at 500 p.s.i. in the Manton-Gaulin Homogenizer and coatings were cast on black cardboard at the rate of approximately 600 square feet per gallon and allowed to air dry overnight. A reflectance of 85 percent was obtained.

The two types of resin components making up the blend used as the binder system must meet certain physical requirements. The matrix structure-forming resin or resin system must be a relatively hard resin which exhibits essentially no creep in film form and little elasticity. It may or may not be a film former; and if its does not form a film its creep may be evaluated by adding a small amount of a suitable plasticizer to form a test film. After the coating composition of this invention is applied to a substrate surface and as the water from the continuous phase is removed, the matrix structure forming resin or resins must be capable of hardening or setting up to form a self-supporting structure to retain the water-immiscible globules in essentially the same spatial relationship as they occupied in the liquid emulsion coating. Finally, this resin component must be compatible with the film-forming resin component, i.e., not precipitated by it in the coating composition or during drying, and also essentially inert to the water-immiscible liquid. It may be soluble or dispersible in the water of the aqueous phase. In addition to the use of casein which is a natural resinous material, many synthetic resin groupings, e.g., styrene and maleic anhydride, are suitable for this component.

The second or film-forming resin component must first, of course, be capable of forming a film. It will generally be a soft film in comparison with the matrix structure-forming resin and may exhibit a wide range of toughness and pressure sensitivity. It will preferably exhibit minimal creep and elasticity. The choice of the film-forming resin component will be determined at least to a great extent by the properties desired in the final coating. As an example of this component we may cite resins containing the acrylic grouping.

The ratio of the two resin components will depend upon the resins used and the properties (reflectance or brightness, pressure-sensitivity, surface characteristics, etc.) required in the final coating. In any composition there must be a sufficient quantity of the matrix-structure forming resin to support the final bubble structure as represented by the attainment of at least 40 percent reflectance for a standard coating weight.

The reflectance data from the examples, along with data on creep, percent elongation and stress for the binders are summarized in table 2. From these data it is possible to define resin weight ratios and the physical properties required of the blend of resin components which go to make up the coating binder.

TABLE 2.—RELATIONSHIP BETWEEN REFLECTANCE AND PHYSICAL PROPERTIES OF BINDER SYSTEM

| Example Number | Weight ratio of matrix structure-forming to film-forming resin | Percent of — Reflectance | Percent of — Creep (25 g.) | Percent of — Elongation | Stress ratio at 10% |
|---|---|---|---|---|---|
| 1 | 75/25 | 67 | 0 | <10 | 42 |
|   | 67/33 | 40 | 3 | 120 | 89 |
|   | 50/50 | 0 | 420 | 380 | 90 |
| 2 | 75/25 | 51 | Low [1] | | |
|   | 72.5/27.5 | 49 | Low [1] | | |
|   | 70/30 | 54 | Low [1] | | |
| 3 | 10/90 | 20 | 380 | 260 | 20 |
| 4 | 15/85 | 67 | 130 | 260 | 27 |
| 5 | 20/80 | 72 | 0 | 210 | 25 |
| 6 | 5/95 | 13 | 270 | 630 | 6 |
| 7 | 10/90 | 55 | 220 | 160 | 82 |
| 8 | 15/85 | 79 | 0 | 120 | 88 |
| 9 | 20/80 | 80 | 0 | 35 | 98 |
| 10 | (2) | 72 | 0 | 0 | |
| 11 | (2) | 68 | 0 | <10 | |
| 12 | (2) | 54 | 150 | 180 | 58 |
| 13 | (2) | 0 | 510 | 375 | 6 |
| 14 | 10/90 | 72 | 7 | <10 | |
| 15 | (2) | 75 | 0 | <10 | |
| 16 | (2) | 85 | 20 | 40 | |
| 17 | 20/80 | 50 | 12 | 68 | 100 |
| 18 | (2) | 80 | 0 | <10 | |
| 19 | (3) | 40 | Low [1] | | |
| 20 | (3) | 85 | Low [1] | | |

[1] Mechanically weak film.
[2] Not precisely determinable—see Examples.
[3] Contained coalescing agent.

Extended experience with these bubble coatings has shown that coatings with reflectances between 40 and 50 percent using the coating weights specified are of marginal acceptability and those with reflectances below 40 percent cannot be classified as satisfactory bubble coatings.

The resins making up the binder of the coating must in combination exhibit low creep and preferably a relatively low percentage of elongation and a relatively high stress ratio. In order to determine these properties the resins are blended in the same weight ratio as they are to be present in the final bubble coating. Then a film of the resin blend is cast and used to determine the properties of the blend in film form without any air-binder interfaces.

Creep which is essentially a measure of cold flow under load is determined by cutting a ½ inch wide strip from the film, making two marks on the film a known distance apart and then firmly attaching one end by means of a clamp. A 25-gram weight is then affixed to the free end and after 16 hours at room temperature the distance between the two spaced marks is again measured. The percent increase in this distance between the marks (corrected for a 1 mil thick film) is the present creep. For purposes of a satisfactory bubble coating the resin blend must have a creep below about 250percent, more desirably below about 150 percent and preferably one which approaches zero.

Percent elongation data for the cast films of the resin blends making up the binder were obtained on the standard Instron tester. The data obtained are measurements of the increase in the length of a film strip when it is pulled until it breaks. This percent elongation may vary to some extent depending upon the coating use. However, it is desirable that it should not be greater than 300 percent for the binder system and it is preferable that it be considerably less than 300 percent, e.g., less than about 200 percent.

Stress ratios are calculated from stress plots by the following formula $$\frac{\text{Stress required for } 10\% \text{ elongation}}{\text{Stress required to break strip}} \times 100.$$

In general, the higher this stress ratio the less elastic is the film and the more desirable is the binder system for bubble coatings. It is preferred that this ratio by greater than 25 for a binder system of this invention. However, this property is essentially a restatement of elongation and it is generally preferable to be guided by the latter.

The liquid forming the discontinuous phase of the emulsion must be a water-immiscible organic liquid, the bulk of which has a boiling range above that of water at the drying temperature required. Moreover, at the initial drying temperature, the discontinuous phase liquid must have a vapor pressure below that of water in order to permit the first portion of the water to be removed to set up the matrix structure-forming resin without any substantial removal of the organic liquid. Suitable water-immiscible organic liquids include, but are not limited to, aliphatic hydrocarbons, commercial petroleum fractions, xylene, kerosene, mineral spirits, high flash naphthas, ketones such as butyl methyl ketone and amyl ethyl ketone, paraffin hydrocarbons such as octane, and the higher-boiling acetates such as butyl acetate or amyl acetate.

The final choice of the liquid forming the discontinuous phase may also require the consideration of such factors as that which will give the brightest coating for a given weight per unit area of surface for a specific film-forming material; that which will prove to be the most compatible with other components such as a binder, the dispersing agent and any particulate additive, dye or dyes added; and that which will meet certain other requirements such as toxicity, inflammability, adaptability to production procedures, cost and the like.

Inasmuch as the mixing of the coating composition of this invention requires a thorough dispersing of one liquid in another, each of which is essentially immiscible in the other, it may be desirable to add a dispersing agent such as those commonly to prepare emulsions if it is not already present in any commercially available latex used. Such a dispersing agent may be one of the appropriate soaps such as ammonium, sodium or potassium oleate or stearate or other suitable emulsifying agents. The dispersing agent may be formed in situ by a reaction between a weak organic acid and an alkali metal ion furnished, for example, from an excess of solubilizing agent. Thus, if stearic acid is added to a coating mixture containing an excess of ammonium ions, ammonium stearate is formed and serves as a dispersing agent.

Generally, the weight ratio of binder material (formed of the resin blend, to the liquid of the discontinuous phase will range from about 1-to- 0.25 to about 1-to-5. The actual ratio will depend upon the characteristic of the final coating desired. As a rule, the smaller amount of binder material, the higher the brightness of the final coating, a preferred ratio being from about 1-to-1 to 1-to-5 for pressure-sensitive coatings, and from about 1-to-0.25 to 1-to-2 for pressure-sensitive coatings.

In preparing the binder solution, or dispersion, it has been found desirable to formulate solutions having from about 5 percent to about 40 percent solids content by weight, the higher solids content solutions being generally preferred since they decrease the ultimate drying load and increase the rate of drying.

One or more particulate additives may be incorporated in the coating of this invention. Such finely divided particulate materials are generally of inorganic origin and inert to the binder material as well as to the discontinuous phase liquid under the condition which the coating is applied to the substrate. The particulate matter is preferably sized finer than 12 microns; however, particle sizes up to those which can be substantially permanently bonded by the binder system may be used. The final surface characteristics of the coating will control the size of the particulate matter; thus, if a coarse surface is undesirable, then the particulate matter will be sized within the finer size range.

It is important to note that the particulate additive used in the coating of this invention is generally not present in the role of a pigment insofar as the term pigment is used generally to denote a material which contributes opacity to a system. On the contrary, it can be shown that although many of the particulate additives can in some coatings and size ranges be considered pigments, they usually contribute less brightness or opacity to the coating of this invention; rather they contribute desirable properties to the surface of the coating. In some instances, the particulate matter actually somewhat reduces opacity and brightness for a given coating weight. The particulate additive may be further characterized as a material which is substantially wetted by either the water solution of the matrix material or by the discontinuous phase liquid and which can be permanently bonded within the final matrix film. The particulate additive may also possess other more specific characteristics such as being highly absorbent to the liquid medium of the ink used in printing, or the capability of imparting modification in the appearance of the surface such as a metallic appearance which would be created by the use of finely divided aluminum powder or flakes as a particular additive.

Typical particulate additives include, but are not limited to, chalk, clay, titania silica, hydrated calcium silicate, metallic powder such as aluminum and bronze, carbon black and dye pigments such as an ultramarine blue and the like. The amount of particulate additive which may be added may be as high as about 3 to 4 times the weight of the total resins forming the binder. Generally, for making coatings suitable for printing, it will be preferable to the use weight ratios of binder to particulate additive of from about 1:0.5 to 1:4.

In mixing the coating composition of this invention, it is desirable to make up the binder solution containing the resin blend and particulate additive separately, and then while stirring add the discontinuous phase liquid containing any dispersing agent. Dyes and other additives may be incorporated into either of the emulsion phases. Subsequent to the formation of the emulsion, it may be necessary to further process the emulsion to adjust the size range of the discontinuous phase globule, that is, of the globules of the water-immiscible organic liquid making up this discontinuous phase. This may be done by any known technique such as passing the emulsion through a homogenizer. Inasmuch as the size range of the globules making up the discontinuous phase of the emulsion is later to determine the size range of the interfaces in the finished dry coating, it is necessary to make this adjustment so that essentially all of the discontinuous phase globules range in size from about one-tenth to 1 micron with no appreciable number exceeding 5 microns.

Once the coating has been thoroughly mixed it is applied to the substrate by any well-known coating technique, and in the case of publication paper by high-speed coating apparatus, e.g., a trailing blade coater. It is not necessary to completely dry the substrate, i.e., paper or wall prior to the application of the coating. Thus, if the coating is to be applied to paper the coating may be an on-machine operation during the actual manufacturing of the paper. Generally, in this case the emulsion coating is applied at a temperature of between about 33° and 38° C. in keeping with high-speed coating techniques. However, it may be applied over a wide temperature range (e.g., from ambient temperature up to 65° C.) so long as the temperature is maintained relatively constant.

The coating composition of this invention may be applied to a wide variety of surfaces or substrates. These include, but are not limited to, tissue paper, publication paper raw stock, paperboard, wood, plaster, plastics and metal. As noted above and as shown in the examples, the coating may be formulated to exhibit a wide range of physical properties, the choice being indicated by the surface to be coated and the use for which the coating is to serve. Such a choice is within the knowledge of those skilled in the coating art.

It will thus be seen that the objects set forth above, among those made apparent from the preceding description, are efficiently attained and, since certain changes may be made in the above composition and article without departing from the scope of the invention, it is intended that all matter contained in the above description shall be interpreted as illustrative and not in a limiting sense.

We claim:

1. A coated article comprising a substrate carrying adhered thereto and opaque binder in substantially continuous film form, said binder film being characterized as a dried, essentially uncollapsed residue of an emulsion wherein the continuous phase of said emulsion becomes said binder which comprises a blend of an essentially nonelastic resin film-forming component and a matrix structure-forming component which is relatively hard compared with said film-forming component, possesses essentially no creep and little elasticity in film form, is capable of hardening to form a self-supporting structure and is compatible with said film-forming component, said binder film being further characterized as having distributed throughout its entire volume multitudinous air-binder interfaces, the sizes of which are substantially equivalent to the globules making up the discontinuous phase of the original emulsion, and essentially all of which vary in maximum dimension from about one-tenth to 1 micron with no appreciable number exceeding 5 microns, thereby providing a uniformly cavernulous substantially continuous structure having a reflectance of at least 40 percent; said binder in a nonbubble film form having a creep at ambient temperature under a 25-gram load of no more than 250 percent corrected for 1-mil thickness, an elongation less than 300 percent and a 10 percent stress ratio greater than 25.

2. An article in accordance with claim 1 wherein said blend comprises an emulsion polymerized styrene homopolymer serving as said matrix structure-forming component and an emulsion polymerized styrene interpolymer, serving as said film-forming component.

3. An article in accordance with claim 1 wherein said blend comprises a styrene-maleic anhydride resin and a homogeneous blend of an emulsion polymerized styrene homopolymer and an emulsion polymerized styrene interpolymer, the styrene of said styrene-maleic anhydride resin and said styrene homopolymer serving as matrix structure-forming components and the maleic anhydride of said styrene-maleic anhydride resin and said styrene interpolymer serving as said film-forming components.

4. An article according to claim 1 wherein said binder in film form on said substrate is pressure sensitive and said substrate is of a color different from said binder.

5. An article in accordance with claim 1 wherein said binder in film form on said substrate is relatively pressure insensitive.

6. An article in accordance with claim 1 wherein said substrate is publication paper raw stock.

7. An article in accordance with claim 1 wherein said substrate is paperboard.

8. An article in accordance with claim 1 wherein said blend comprises a physical mixture of at least one matrix structure-forming resin and at least one film-forming resin.

9. An article in accordance with claim 1 wherein said matrix structure-forming component comprises casein.

10. An article in accordance with claim 1 wherein said matrix structure-forming component contains a styrene grouping.

11. An article in accordance with claim 1 wherein said film-forming component contains an acrylic grouping.

12. An article in accordance with claim 1 wherein said matrix structure-forming component contains a maleic anhydride grouping.

13. An article in accordance with claim 1 further characterized by having finely divided particulate material uniformly distributed throughout said binder.

* * * * *